US005139408A

United States Patent [19]

Cummings et al.

[11] Patent Number: 5,139,408

[45] Date of Patent: Aug. 18, 1992

[54] APPARATUS FOR CLEANING BRAEBENDER-TYPE MIXING APPARATUS

[75] Inventors: Michael F. Cummings, Madison; Bruce V. Buskirk, Dover; Raymond E. Trunk, Madison, all of N.J.

[73] Assignee: Allied-Signal Inc., Morris Township, Morris County, N.J.

[21] Appl. No.: 651,866

[22] Filed: Feb. 7, 1991

[51] Int. Cl.[5] ........ B29B 7/22

[52] U.S. Cl. ........ 425/186; 264/39; 264/349; 425/189; 425/225; 15/104.011

[58] Field of Search ........ 425/203, 204, 208, 209, 425/225, 186, 382.4, 189, 190; 264/39, 349; 366/77, 85; 15/104.011

[56] References Cited

U.S. PATENT DOCUMENTS

| | | | |
|---|---|---|---|
| 2,615,199 | 10/1952 | Fuller | 425/203 |
| 2,965,926 | 12/1960 | Von Haase | 425/225 |
| 3,078,512 | 2/1963 | De Haven | 264/39 |
| 3,657,195 | 4/1972 | Doerfel et al. | 425/203 |
| 4,136,968 | 1/1979 | Todd | 425/204 |
| 4,599,002 | 7/1986 | Gutknecht | 425/204 |
| 4,711,647 | 12/1987 | Gathmann | 425/203 |

FOREIGN PATENT DOCUMENTS

| | | | |
|---|---|---|---|
| 61-43533 | 3/1986 | Japan | 264/39 |

*Primary Examiner*—Jeffery Thurlow
*Assistant Examiner*—Mathieu Vargot
*Attorney, Agent, or Firm*—Andrew N. Parfomak; Roger H. Criss

[57] ABSTRACT

A cleaning insert for insertion into a disassembled braebender-type mixing apparatus, wherein the inserted cleaning insert separates the two cavities of the apparatus allowing each to be cleaned of reside from a polymeric composition without permitting the passage of loosened residue therebetween. Also provided is an improved method of cleaning a braebender-type mixing apparatus utilizing the cleaning insert.

2 Claims, 3 Drawing Sheets

APPARATUS FOR CLEANING BRAEBENDER-TYPE MIXING APPARATUS

BACKGROUND

1. Field of the Invention

The present invention relates to a process and apparatus for use in cleaning a braebender-type mixing apparatus having two at least partially circular screw cavities.

2. Description of the Prior Art

In the development of polymer containing compositions, it is desirable to produce experimental compositions utilizing conventional processing equipment. The use of conventional processing equipment in the evaluative stage of development of polymer containing compositions is to be preferred as the processing equipment provide the environment in which a composition, if ultimately successful, would be produced on a larger, commercial scale. A screw type extruder having a single, or in the alternative, plural screws, is commonly used in commercial production of a polymeric compositions such as an extruder provides effective heating and mixing of the initial constituents. While such a screw type extruder would be most desirable for use in the development of a polymer containing composition, such extruders typically require sufficient initial constituents on the order of tens of pounds for the production of any meaningful quantity of product sample.

In order to overcome this and other limitations attendant upon the use of screw type extruders, a braebender-type mixer, also known to the art as a bowl mixer or a bowl mixing apparatus, is frequently used to produce small quantities of a polymer containing composition, especially during the development of novel compositions. As is well known to the art, braebender-type mixing apparatus may be advantageously used in the stead of screw type extruders as such braebender-type mixing apparatus typically include two co-rotating or counter-rotating screws wherein each of the screws is housed in an annulus which is nearly circular, or arcuate in configuration and where the screws further have designs of flights which when operating, cooperatively function to assure thorough mixing of the constituents by simulating the shear forces and other mixing effects which would be imparted on the composition in an extruder.

While providing the benefits of approximate of extruder conditions, braebender-type mixing apparatus are nonetheless not without shortcomings. One such deficiency is apparent upon cleaning; the braebender-type mixing apparatus is disassembled and any residue from a composition need be removed. Typically the screws may be removed and the residue thereon removed by applying sufficient heat to burn off any residue, but, in the case of the body and housing which is typically not removable, the use of a wire brush and/or a wire wheel need be used. Such an operation is laborious, and is further complicated by a tendency observed when a wire wheel mounted on a hand holdable electrical drill is used; as the wire wheel spins within one of the two cavities, loosened residue of a polymeric composition is heated by the friction of the brush and shoots to the other cavity where it clings to the inner surface of the other cavity.

What is needed in the art is an improved process and apparatus for use in the cleaning of braebender-type mixing apparatus.

SUMMARY

In one aspect of the invention, there is provided a cleaning insert for insertion into a disassembled braebender-type mixing apparatus, wherein the inserted cleaning insert is dimensioned so that it may be positioned to separate the two cavities of the braebender-type mixing apparatus allowing each to be cleaned of reside from a polymeric composition without permitting the passage of loosened residue therebetween.

In a further aspect of the invention, there is provided a cleaning insert having two arcuate faces which, when inserted into a disassembled braebender type mixing apparatus, the arcuate shape of each face being substantially equally distant from a central axis of a respective cavity as is the wall of each cavity from the same central axis, and further, being dimensioned so that arcuate shape of each face substantially completes any gap in the circumference of the cavities existent prior to the insertion of the cleaning insert.

In yet another aspect of the invention there is provided an improved method for cleaning the cavities of braebender-type mixing apparatus which comprises the steps of providing a cleaning insert having a configuration so dimensioned so that it may be inserted and positioned within the braebender-type mixing apparatus and between the cavities thereof, and the step of cleaning the cavities by conventional methods, including the use of a wire brush or wire wheel.

In still another aspect of the invention, a method of cleaning a braebender-type mixing apparatus comprises the steps of inserting a cleaning insert having a configuration which comprises two arcuate faces and subsequently using a cylinder honing apparatus to clean the interior of the cavities of the braebender-type mixing apparatus.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

DESCRIPTION OF THE PREFERRED EMBODIMENTS

Figure 1:
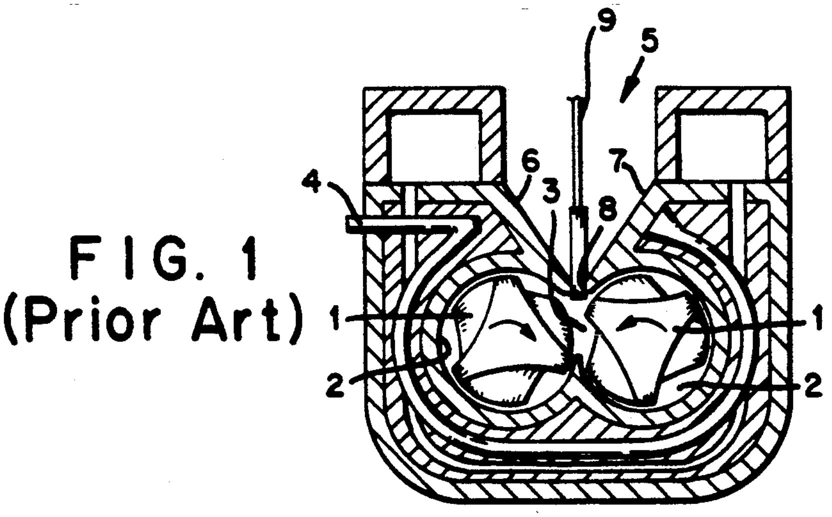
FIG. 1 (Prior Art)
FIG. 1 is a cross-sectional view of section of a braebender-type mixing apparatus known to the art.

In the following embodiments of the invention, it is to be understood that in the description of any of the braebender-type mixing apparatus illustrated by the FIGS., reference numerals depict like elements and are to be considered uniform throughout. Exceptions to this convention will be particularly noted.

Braebender type mixers, also known to the art as bowl mixers, which are well known to the art may be generally characterized as having a housing, which housing contains two arcuate cavities of roughly equal proportions, each of the arcuate cavities housing a mixing screw. These two arcuate cavities are nearly circular and would form complete circles if the walls of the said cavities did not intersect and form an intersecting common passage therebetween. Further, the housing typically includes a heat source which when activated provides heat which may melt at least one of the constituents in a composition to flow, and other structures which find use during operation.

Turning now to FIG. 1, therein is depicted a cross-sectional view of portion of a braebender-type mixing apparatus of a type well known to the art, having two mixing screws 1, two arcuate cavities 2 at least partially surrounding the screws, a gap region 3 which is an open region at the intersection of the arcuate cavities which allows for the passage of material, i.e., a polymer composition as well as a residue thereof between the arcuate cavities 2, a heating coil 4 partially surrounding the arcuate cavities, a throat 5 having two tapered faces 6,7 which converge towards throat gap 8 which provides a passage from the throat 5 to the gap region 3 for any constituents which are to be introduced to the mixing screws 1 and the arcuate cavities 2. During operation, a ram 9 is provided which when inserted through the throat 5 and past the tapered faces 6,7 and into the throat gap 8, blocks the throat gap 8 and restricts the escape of any polymeric composition being acted upon by the mixing screws 1.

During operation, the ram 9 is withdrawn from the throat 5 and the throat gap 8, which allows for the insertion of constituents forming a polymeric composition therethrough. Afterwards, the ram 9 is returned to its original position restricting the escape of any polymeric composition, and braebender-type mixing apparatus is energized, heating and mixing the constituents.

At the conclusion of the formation of a polymeric composition, as much as of the said composition is removed and the braebender-type mixing apparatus is allowed to cool. Typically, the mixing screws 1 are removed. During this cooling process, residual composition which had not been previously removed and which remains typically hardens on the interior surfaces of the mixer, in particular the surfaces of the mixing screws 1 and the interior of the arcuate cavities 2. This is highly undesirable.

Figure 2:
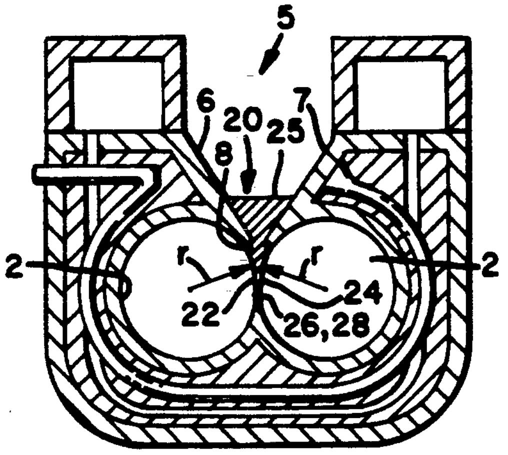
FIG. 2 illustrates a cleaning insert in accordance with one aspect of the present invention.

Now with reference to FIG. 2, therein is depicted a cleaning insert 20 in accordance with one aspect of the present invention and inserted within the braebender-type mixing apparatus which is disassembled and the mixing screws removed subsequent to its operation. With reference to this figure, it can be seen that the cleaning insert 20 is configured so to be insertable between the tapering sides 6,7 of the throat, as well as to occupy the throat gap 8 and to taper to form two arcuate faces 22,24, each face being directed towards one of the two cavities 2, and to have a top surface 25 at one end, and to terminate at the boundary peak 26 between the two cavities 2 at a second terminal surface 28. It should be thus apparent that the cleaning insert 20 when properly inserted into the braebender-type mixing apparatus acts as a barrier, dividing and separating the cavities 2. In preferred and in most preferred embodiments of the invention, each of the arcuate faces 22,24 is of an arc which is coincidental with the radius, as indicated by radial arrows labeled "r", of each of the cavities. This will be more particularly defined in the discussion regarding FIG. 3.

Figure 3:
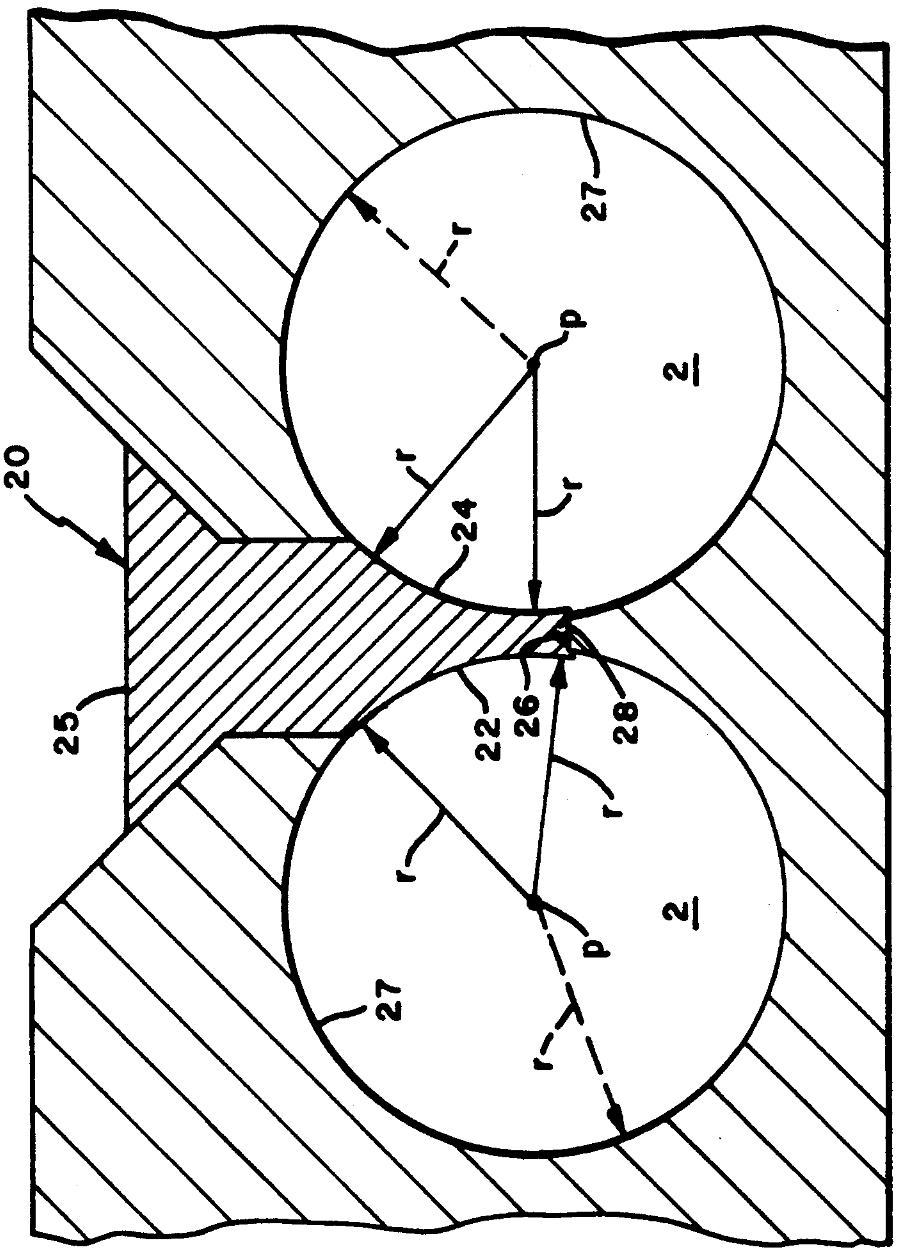
FIG. 3 is a partial view illustrating with more particularity the cleaning insert shown in FIG. 2.

FIG. 3 is a partial view illustrating with more particularity the cleaning insert 20 shown on FIG. 2 and inserted into the braebender-type mixing apparatus. As is seen in this cross-sectional view, the cleaning insert 20 has two arcuate faces 22,24 one of each which faces one or the other of the two cavities 2. As the two cavities 2 have arcuate walls 27 defined as being a radial distant "r" equidistant from a central point "p", in preferred and most preferred embodiments, the two arcuates faces 22,24 are dimensioned so to be the same radial distance "r" from the central point "p" and to thereby coincide with the arcuate walls 27 of the cavities 2. Further, it may be seen that the boundary peak 26 coincides with a terminal surface 28 of the cleaning insert 20 and forms a barrier between the two cavities 2.

Figure 4:
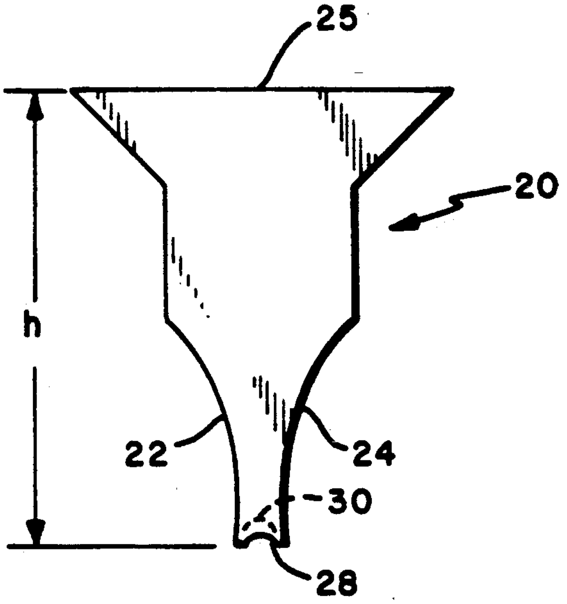
FIG. 4 illustrates a cross-sectional profile of the cleaning insert of FIGS. 2 and 3.

FIG. 4 illustrates a cross-sectional profile of the cleaning insert 20 of FIGS. 2 and 3, and further illustrates the arcuate faces 22,24 and the terminal surface 28 configured to coincide with a boundary peak 26 of a braebender-type mixing apparatus. The height of the cleaning insert 20 is indicated by the dimension "h", and it is to be understood that this height may be any length or distance which is equal to or greater than the distance between the boundary peak 26 and the end of the throat gap 8 closest to the boundary peak 26.

Figure 5:
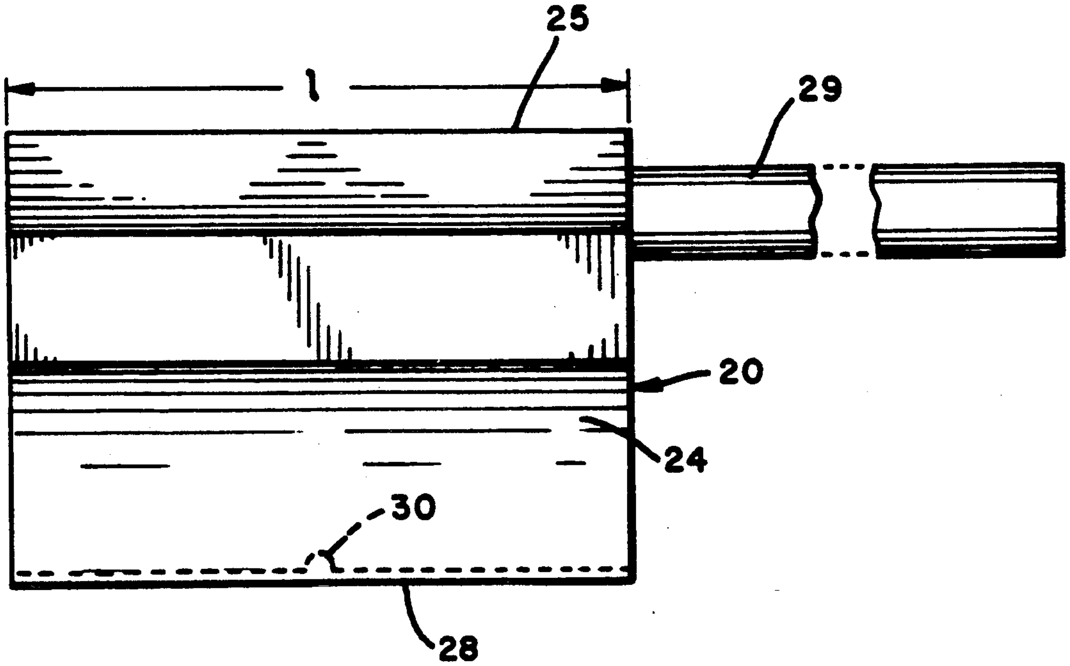
FIG. 5 illustrates a side view of the cleaning insert shown on FIGS. 2-4 in accordance with a preferred embodiment of the invention.

FIG. 5 illustrates a side view of the cleaning insert 20 shown on FIGS. 2–4 in accordance with a preferred embodiment of the invention, and further illustrates an optional but preferred handle 29 useful in inserting and removing the cleaning insert into a braebender-type mixing apparatus. Also shown in phantom is a small voidage or hole 30 which is so positioned to provide clearance for a thermocouple which is found on the boundary peak 26 of certain braebender-type mixing apparatus. The length of the cleaning insert 20 is indicated as "1", and it is to be understood that the length of the cleaning insert 20 may be any length, but preferably is a length which is sufficient so that when the cleaning insert 20 is inserted within the braebender-type apparatus whose arcuate cavities 2 have a thickness "t" as shown, that the length "1" be at least as great as the thickness "t", which assures a total barrier between the two arcuate cavities 2.

The cleaning insert 20 may be constructed of any material which may be formed, preferably a metal including aluminum, copper, iron, steel, bronze, as well as alloys containing at least one of these metals with other materials are preferred as such are readily available and readily machineable. Most preferred is aluminum and an alloy containing aluminum.

The dimensins of a cleaning insert 20 are variable and are only bounded by the above specification; while it is preferred that the arcuate faces 22,24 be arcuate, it is also recognized that these faces may have a cross-sectional profile which is other than arcuate in shape, such as a flat shape. Further, it is recognized that the two arcuate cavities 2 may be of differing size, and hence have dissimilar radii. Consequently, it should be apparent that a cleaning insert 20 may be constructed in accordance with the present invention's teaching wherein the arcuate faces 22, 24 be defined by dissimilar arcs, wherein each arcuate face 22, 24 be coincidental to the arc of the respective arcuate cavity 2 which it will face when inserted. Arcuate profiles are preferred as they facilitate the use of a wire wheel mounted on a hand operable electric drill; the absence of any protrusion which extends to one or more points which would be less than the radial distance "r" allows for the wire wheel to more effectively remove any residue within either of the cavities 2 while the cleaning insert 20 effectively block the passage of any loosened residue from the cavity which is being cleaned into the other cavity. Further, it is understood that the height and the length of the cleaning insert 20, as well as the dimensins of the terminal surface 28 and any holes 30 are dependent upon the size and shape of the braebender-type mixing apparatus with which the instant invention is to be used.

The use of a cleaning insert 20 allows for the practice of an improved method for cleaning the cavities of a braebender-type mixing apparatus which comprises the steps of providing a cleaning insert 20 having a configuration so dimensioned so that it may be inserted and positioned within the braebender-type mixing apparatus and to separate the cavities thereof, after which conventional methods, including the use of a wire brush or wire wheel or cup shaped wire wheel mounted on an hand-holdable electrical drill to scrape out remaining residue. The wire brush, wire wheel or cut shaped wire wheel is utilized until the desired amount of residue is removed. Optionally a solvent or other aid to removing the residue may be used. The use of the cleaning insert 20 during the application of conventional cleaning techniques halt the transference of loosened residue from one cavity 2 to the other cavity 2.

Figure 6:
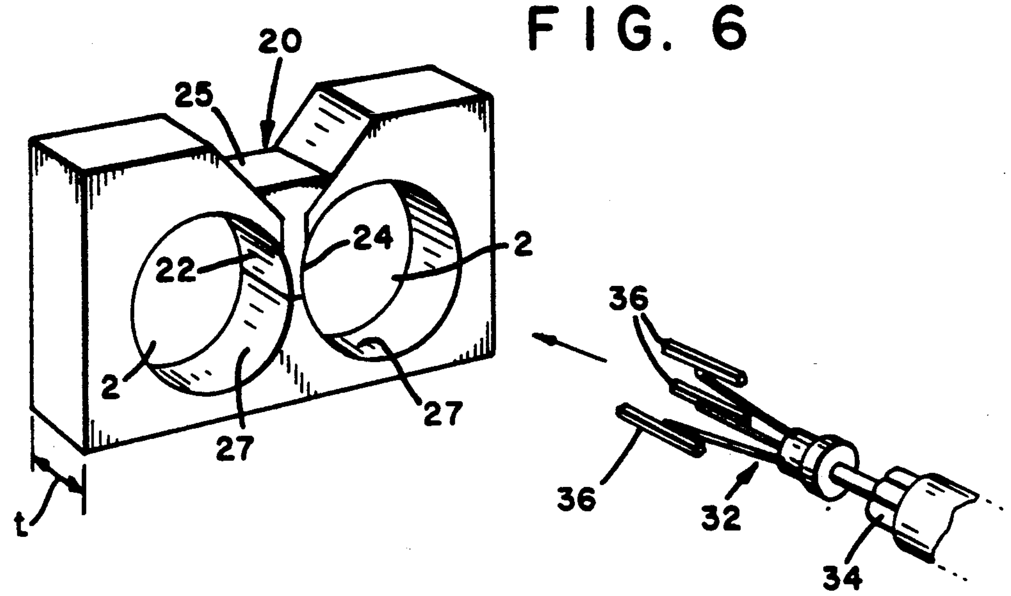
FIG. 6 illustrates a perspective view of a braebender-type mixing apparatus with a cleaning insert and a cylinder honing apparatus.

In the most preferred method of cleaning a braebender-type mixing apparatus, a cleaning insert 20 having arcuate faces 22, 24 dimensioned to coincide with the arcuate shape of the walls 27 of the cavi81 inserted. This method of cleaning is more clearly understood with reference to the apparatus depicted on FIG. 6. A cylinder hone 32 includes a plurality of honing stones 36, (here 3) which are radially extendable. The cylinder hone 32 is removably mounted to a rotating motor, most preferably as partially shown here, in the chuck 34 of a hand-holdable electric drill. To clean, the cylinder hone 32 is inserted into either of the cavities 2 and the honing stones 36 radially extended so to contact the wall 27 of the cavity 2 and an arcuate face 22 or 24 of the cleaning insert 20. The rotating motor is energized which causes the honing stones 36 to make sliding frictional contact with the wall 27 and with the arcuate face 22 or 24 of the cleaning insert 20. It should be evident that the arcuate faces 22, 24 having the same arc as the wall 27 of a cavity 2 facilitates the travel of the honing stones 36 making sliding contact with the wall 27. This process is operated until the cavity 2 is satisfactorily cleaned, after which cylinder hone 32 is withdrawn and the operation repeated for the other cavity 2. When both cavities are cleaned, the cylinder hone 32 and the cleaning insert 20 removed and the braebender-type mixing apparatus may be reassembled for further use.

EXAMPLE

A cleaning insert was fabricated from aluminum in accordance with FIGS. 2–6. The braebender-type mixer was a "Rheomix" Model 3000 Type EI EC available from Haake, Inc. of Saddle Brook, N.J. The cavities of the mixers had an approximate diameter of $2\frac{5}{8}$ inches. A cleaning insert as the one illustrated on FIG. 3 had a height, "h" of $2\frac{5}{8}$ inches, and the radius of the arcuate portions of faces 22, 24 coincided with the radius of the walls 27 of each of the cavities.

In use, the Rheomix mixer was allowed to cool, and dissassembled. A cleaning insert 20 was inserted as described above, and a c-clamp having a "C" shape was used to removably secure the insert in its position. The cavities 2 were first cleaned using a cup-shaped wire wheel having a 2-inch diameter to remove a major amount of the polymeric composition being cleaned, after which a cylinder honing tool having three stones ws used to clean the walls 27 of each of the cavities 2. Afterwards, the c-clamp was disengaged and removed and the cleaning insert 20 was withdrawn.

It will be appreciated that the instant specification set forth herein are by way of illustration and not limitation, and that various modifications and changes may be made without departing from the spirit and scope of the present invention, whose limitations are bounded only by the appendant claims.

We claim:

1. A cleaning insert for use in conjunction with a mixing apparatus having a thickness "t" wherein said apparatus includes:

(a) two arcuate cavities, (b) a boundary peak, and (c) a throat gap, said cleaning insert having two arcuate faces each having an arc coincidental with the radius of one of the arcuate cavities of the apparatus, and a terminal surface dimensioned to coincide with the boundary peak of the apparatus such that when the cleaning insert is inserted within the throat gap of the apparatus the cleaning insert forms a barrier between the two arcuate cavities of the apparatus, and a handle extending outward from an end of the cleaning insert in a direction which is co-linear with the terminal surface and, wherein the cleaning insert has a length "1" which is substantially equal to or in excess of the thickens "t" of the mixing apparatus.

2. The cleaning insert according to claim 1 which comprises:

a hole for providing clearance for a thermocouple.

* * * * *